United States Patent
Koh et al.

(10) Patent No.: US 8,576,540 B2
(45) Date of Patent: Nov. 5, 2013

(54) COATING COMPOSITION FOR FORMING HIGHLY DIELECTRIC FILM AND HIGHLY DIELECTRIC FILM

(75) Inventors: Meiten Koh, Settsu (JP); Mayuko Tatemichi, Settsu (JP); Eri Mukai, Settsu (JP); Miharu Ota, Settsu (JP); Kouji Yokotani, Settsu (JP); Nobuyuki Komatsu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 160 days.

(21) Appl. No.: 12/933,341

(22) PCT Filed: Mar. 17, 2009

(86) PCT No.: PCT/JP2009/055162
§ 371 (c)(1), (2), (4) Date: Sep. 17, 2010

(87) PCT Pub. No.: WO2009/116527
PCT Pub. Date: Sep. 24, 2009

(65) Prior Publication Data
US 2011/0013343 A1    Jan. 20, 2011

(30) Foreign Application Priority Data

Mar. 19, 2008 (JP) .................... 2008-071764

(51) Int. Cl.
*H01G 4/08* (2006.01)
*H01G 4/06* (2006.01)

(52) U.S. Cl.
USPC ........................................... 361/323; 361/311

(58) Field of Classification Search
USPC ................................................... 361/323, 311
See application file for complete search history.

(56) References Cited

U.S. PATENT DOCUMENTS

2003/0158310 A1    8/2003   Asano et al.
2009/0281224 A1*   11/2009  Koh et al. ...................... 524/435

FOREIGN PATENT DOCUMENTS

| JP | 01-204959 A | 8/1989 |
| JP | 2001-261959 A | 9/2001 |
| JP | 2008-034189 A | 2/2008 |
| WO | 01/78171 A1 | 10/2001 |

* cited by examiner

*Primary Examiner* — Eric Thomas
(74) *Attorney, Agent, or Firm* — Sughrue Mion, PLLC

(57) ABSTRACT

The present invention provides a nonporous highly dielectric film which can improve withstanding voltage, insulating property and dielectric constant, especially can decrease a dielectric loss at high temperatures and can be made thin, and a coating composition for forming the highly dielectric film comprising (A) a vinylidene fluoride resin, (B) a cellulose resin and (C) a solvent.

10 Claims, No Drawings

COATING COMPOSITION FOR FORMING HIGHLY DIELECTRIC FILM AND HIGHLY DIELECTRIC FILM

TECHNICAL FIELD

The present invention relates to a coating composition for forming a highly dielectric film being suitable for a film capacitor and to a highly dielectric film.

BACKGROUND ART

So far, vinylidene fluoride (PVdF) has been proposed for the use on a film for a film capacitor because of its high dielectric constant. However, it is known that temperature dependency of dielectric loss tangent (tan δ) of PVdF is high and dielectric loss tangent rises rapidly at high temperatures (80° C. or more) (Patent Document 1, etc.). As dielectric loss tangent is increased, namely as a dielectric loss is increased, a film capacitor becomes unstable, thereby impairing reliability on a circuit.

Patent Document 1 describes that by blending polyether such as polyoxymethylene in a given amount to PVdF, a dielectric loss of PVdF can be decreased and can be decreased lower than that of PVdF itself.

However, in the case of blending polyether, there is room for improvement in high temperature dependency of dielectric loss.

In the meantime, use of a variety of characteristics obtained by mixing various other resins to PVdF has been generally carried out. For example, Patent Document 1 describes mixing of polyvinyl acetate, acrylic resin or the like to PVdF to prepare a thermoplastic resin composition for molding and coating.

In order to prepare such a composition comprising PVdF, mixing of a hydrophilic polymer such as polycellulose acetate is also known (Patent Document 2), and this composition is formed into a porous film to be used as a semipermeable film for ultrafiltration and a semipermeable film for ultrafine filtration.

Patent Document 1: JP60-199046A
Patent Document 2: JP2-78425A

DISCLOSURE OF INVENTION

Problem to be Solved by the Invention

It is an object of the present invention to provide a nonporous highly dielectric film which can improve withstanding voltage, insulating property and dielectric constant, especially can decrease a dielectric loss at high temperatures and can be made thin, and a coating composition for forming the highly dielectric film.

Means to Solve the Problem

The present invention relates to a coating composition for forming a highly dielectric film comprising:
(A) a vinylidene fluoride resin,
(B) a cellulose resin, and
(C) a solvent.

In the composition of the present invention, it is preferable that a mass ratio of the vinylidene fluoride resin (A)/cellulose resin (B) is 0.1/99.9 to 99.9/0.1 for aiming at decreasing a dielectric loss of vinylidene fluoride and improving a dielectric constant of cellulose.

It is preferable that the above-mentioned cellulose resin (B) is cellulose acetate or ether-substituted cellulose, from the viewpoint of good mechanical properties of a film.

It is preferable that the vinylidene fluoride resin (A) is a polymer comprising 60 to 100% by mole of vinylidene fluoride unit, 0 to 40% by mole of tetrafluoroethylene unit and 0 to 40% by mole of hexafluoropropylene, from the viewpoint of high dielectric constant.

The composition of the present invention may comprise rubber particles (D). When the rubber particles (D) are contained in the composition, mechanical strength, especially elongation of the obtained film is improved, and properties such as rubber elasticity can be imparted to the film.

The present invention also relates to a method for preparing a nonporous highly dielectric film comprising casting the coating composition of the present invention on a surface of a nonporous substrate, and after drying, separating a film from the substrate.

The present invention further relates to a nonporous highly dielectric film comprising a vinylidene fluoride resin (A) and a cellulose resin (B), and (A) is contained in an amount of 2 to 98 parts by mass when the total amount of (A) and (B) is assumed to be 100 parts by mass.

When the rubber particles (D) are contained, the amount thereof is preferably 1 to 30 parts by mass based on 100 parts by mass of the vinylidene fluoride resin (A).

The present invention further relates to a nonporous highly dielectric film obtained by the preparation method of the present invention.

These nonporous highly dielectric films are suitable as a film for a film capacitor.

The present invention further relates to a film capacitor prepared by laminating an electrode layer on at least one surface of the highly dielectric film of the present invention.

Effect of the Invention

The present invention can provide a nonporous highly dielectric film suitable for a film capacitor which can improve withstanding voltage, insulating property and dielectric constant, especially can decrease a dielectric loss at high temperatures and can be made thin, and also can provide a coating composition for forming the nonporous highly dielectric film.

BEST MODE FOR CARRYING OUT THE INVENTION

First, the coating composition of the present invention for forming the nonporous highly dielectric film is explained below.

The coating composition of the present invention comprises (A) the vinylidene fluoride (VdF) resin, (B) the cellulose resin and (C) the solvent.

Each component is explained below.

(A) VdF Resin

Examples of the VdF resin are a VdF homopolymer (PVdF) and in addition, copolymers comprising VdF and one or two or more of other monomers being copolymerizable with VdF, and among these, preferred are those having a dielectric constant of not less than 4, further not less than 6, furthermore not less than 7, especially not less than 7.5, from the viewpoint of enhancement of withstanding voltage, insulating property and dielectric constant.

The VdF resin (A) may be a vinylidene fluoride (VdF) homopolymer (PVdF) and a copolymer comprising VdF and other monomer being copolymerizable with VdF. The VdF resin (A) may also be a blend of a VdF homopolymer and a VdF copolymer or a blend of VdF copolymers.

Examples of other monomer being copolymerizable with VdF are fluorine-containing olefins such as tetrafluoroethylene (TFE), chlorotrifluoroethylene (CTFE), trifluoroethylene (TrFE), monofluoroethylene, hexafluoropropylene (HFP) and perfluoro(alkyl vinyl ether) (PAVE); fluorine-containing acrylates and fluorine-containing monomers having functional group. Among these, from the viewpoint of good solubility in a solvent, TFE, CTFE and HFP are preferred. With respect to the copolymerization ratio, it is preferable that the amount of VdF is not less than 50% by mole, preferably not less than 60% by mole from the viewpoint of a high dielectric constant and high solubility in a solvent.

Especially a polymer comprising 60 to 100% by mole of VdF unit, 0 to 40% by mole of TFE unit and 0 to 40% by mole of HFP is preferred since a dielectric constant is not less than 6.

Specifically there are exemplified a VdF homopolymer (PVdF), VdF/TFE copolymer, VdF/TFE/HFP copolymer, VdF/HFP copolymer, VdF/CTFE copolymer, and the like, and especially from the viewpoint of high dielectric constant and good solubility in a solvent, PVdF, VdF/TFE copolymer and VdF/HFP copolymer are preferred.

In the case of a VdF/TFE copolymer, it is preferable that the copolymer comprises 60 to 95% by mole of VdF unit and 5 to 40% by mole of TFE unit, especially the copolymer comprises 70 to 90% by mole of VdF unit and 10 to 30% by mole of TFE unit, since a withstanding voltage becomes high. In order to decrease a dielectric loss of the VdF resin itself, it is also preferable to copolymerize with ethylene, propylene, alkyl vinyl ether, vinyl acetate, vinyl chloride, vinylidene chloride, $CH_2=CHCF_3$ or $CH_2=CFCF_3$. In this case, since such compounds hardly react directly with VdF, copolymerization can be carried out together with other copolymerizable monomers mentioned above such as TFE. Also, it is preferable that a dielectric constant (1 kHz, 25° C.) of the VdF resin itself is not less than 5, preferably not less than 6, further preferably not less than 7.5 from the viewpoint of further increase in a dielectric constant of the film. An upper limit is not limited particularly, and is usually 15, preferably 13.

(B) Cellulose Resin

Cellulose resin is blended to reduce temperature dependency of a dielectric constant of the VdF resin (A), especially temperature dependency at high temperatures.

Examples of the cellulose resin are ester-substituted celluloses such as cellulose monoacetate, cellulose diacetate, cellulose triacetate and cellulose acetate propionate; ether-substituted celluloses such as methyl cellulose, ethyl cellulose and hydroxy propyl methyl cellulose, and the like. Among these, cellulose (mono-, di, tri-)acetate and methyl cellulose are preferred because of temperature coefficient of a dielectric loss.

The ratio (mass ratio) of the VdF resin (A) to the cellulose resin (B) is preferably not less than 0.1/99.9 from the viewpoint of high dielectric constant and low dielectric loss, further preferably not less than 20/80 from the viewpoint of good mechanical properties. Also, (A)/(B) is preferably not more than 99.9/0.1 from the viewpoint of low dielectric loss, good mechanical properties and high dielectric constant, further preferably not more than 98/2 from the point that temperature dependency of dielectric loss is low.

(C) Solvent

Optional solvents dissolving the VdF resin (A) and the cellulose resin (B) can be used as a solvent, and especially polar organic solvents are preferred. Among polar organic solvents, ketone solvents, ester solvents, carbonate solvents, cyclic ether solvents and amide solvents are preferred. Preferred examples are methyl ethyl ketone, methyl isobutyl ketone, acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide, dimethylacetamide and the like.

In the coating composition of the present invention, it is preferable to adjust the total solid content of the VdF resin (A), the cellulose resin (B) and other optional components to be within a range from 5 to 30% by mass with the solvent (C), from the viewpoint of easy coating work and good stability of the composition.

(D) Rubber Particles

In the present invention, the rubber particles (D) fill the role of imparting mechanical strength, especially elongation and further properties such as rubber elasticity to the film.

Non-limiting examples of rubbers of rubber particles suitable for achieving such a role are diene rubbers such as acrylic rubber, butadiene rubber, silicone rubber, silicon/acryl compound rubber, natural rubber, nitrile rubber, urethane rubber, styrene/butadiene rubber and isoprene rubber; fluorine-containing rubbers such as VdF/tetrafluoroethylene (TFE) rubber; and the like.

Among these, acrylic rubber, butadiene rubber and silicone rubber are preferred from the viewpoint of high dielectric constant and good dispersibility.

The rubber particles may be so-called core/shell rubber particles obtained by coating a surface of the mentioned rubber particles with at least one selected from the group consisting of polymethyl methacrylate and acrylonitrile/styrene copolymer. These core/shell rubber particles have good compatibility with the vinylidene fluoride resin.

The rubber particles may be un-crosslinked rubber (crude rubber) particles and may be crosslinked rubber particles. From the viewpoint of good solvent resistance, crosslinked rubber particles are preferred. Crosslinking of rubber may be conducted by known method.

An average primary particle size of the rubber particles (D) is preferably 0.1 to 2.0 μm, further preferably 0.15 to 1.5 μm, especially preferably 0.2 to 1.0 μm since improvement in both of dispersibility in the resin and film strength can be achieved.

The amount of rubber particles (D) is not less than 1 part by mass, preferably not less than 5 parts by mass, especially preferably not less than 10 parts by mass based on 100 parts by mass of the vinylidene fluoride resin (A). When the amount is too small, an effect of improving mechanical strength, especially elongation of the film tends to be decreased. An upper limit of the amount is 30 parts by mass. When the amount is too large, dispersibility in the resin tends to be inferior. A preferred upper limit is 20 parts by mass.

(E) Other Optional Components

To the coating composition of the present invention may be added, as optional components, additives such as other reinforcing filler and affinity improver to an extent not to impair the effect of the present invention.

Examples of reinforcing filler are particles and fibers of silica, silicon carbide, silicon nitride, magnesium oxide, potassium titanate, glass, alumina and boron compounds, and examples of affinity improver are polyolefin modified with functional group, styrene-modified polyolefin, polystyrene modified with functional group, polyacrylimide, cumylphenol and the like. These may be contained to an extent not to impair the effect of the present invention. From the viewpoint of withstanding voltage, it is more preferable that these components are not contained.

In the present invention, temperature dependency of dielectric loss, especially temperature dependency at high temperatures can be decreased even without blending highly dielectric inorganic particles which are often blended in a highly dielectric film capacitor.

Examples of highly dielectric inorganic particles are strontium titanate, barium titanate, lead zirconium titanate oxides (PZT), barium zirconium titanate, barium zirconate, strontium zirconate, calcium titanate, calcium zirconate and the like.

The coating composition of the present invention can be prepared by dissolving or dispersing each of the mentioned components in the solvent.

For the coating of the coating composition of the present invention, a knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed. Among these, a roll coating method, a gravure coating method and a cast coating method are preferred from the viewpoint that operation is easy, non-uniformity of a film thickness is small and productivity is satisfactory, and especially a cast coating method is preferred and an excellent film for a film capacitor can be produced.

When the coating composition of the present invention is cast on a surface of a nonporous substrate, dried and then separated from the substrate, the obtained nonporous highly dielectric film is high in withstanding voltage, has high insulating property, is thin, has flexibility and is low in temperature dependency of dielectric loss.

A nonporous substrate to be used for cast coating is not limited particularly as far as it enables a dense film surface to be formed, and, for example, there are exemplified resin films such as polyester film, polycarbonate film and polyimide film; and metallic foils such as aluminum foil and copper foil. Also preferred are substrates subjected to mold-releasing treatment.

When the thus-obtained nonporous highly dielectric film of the present invention is used as a film for a film capacitor, its thickness can be not more than 20 µm, preferably not more than 10 µm, further preferably not more than 6 µm, especially preferably not more than 5 µm. A preferred lower limit of the thickness is about 2 µm from the viewpoint of maintaining mechanical strength.

The present invention also relates to the nonporous highly dielectric film comprising the VdF resin (A) and the cellulose resin (B), wherein (A) is contained in an amount of 2 to 98 parts by mass when the total amount of (A) and (B) is assumed to be 100 parts by mass.

The nonporous highly dielectric film prepared using the coating composition of the present invention can contain 0.1 to 99.9 parts by mass, preferably 2 to 98 parts by mass of the VdF resin (A), assuming (A)+(B) to be 100 parts by mass. Particularly, when assuming (A)+(B) to be 100 parts by mass, the nonporous highly dielectric film comprising 2 to 40 parts by mass, further preferably 5 to 30 parts by mass of the VdF resin (A) has dielectric constant lower than that of a film comprising only a VdF resin but higher than that of a film comprising only a cellulose resin, and temperature dependency of dielectric loss can be greatly decreased and withstanding voltage is improved. Also, when assuming (A)+(B) to be 100 parts by mass, the nonporous highly dielectric film comprising 60 to 98 parts by mass, further preferably 70 to 95 parts by mass of the VdF resin (A) has high dielectric constant derived from the VdF resin, and in addition, temperature dependency of dielectric loss can be decreased and withstanding voltage is improved.

The present invention also relates to the film capacitor prepared by laminating an electrode layer on at least one surface of the nonporous highly dielectric film of the present invention.

Examples of a structure of a film capacitor are a laminated type comprising electrode layers and highly dielectric films laminated alternately (JP63-181411A, JP3-18113A, etc.) and wound type prepared by winding a tape-like highly dielectric film and electrode layer (film capacitor disclosed in JP60-262414A, in which an electrode is not laminated continuously on a highly dielectric film, and film capacitor disclosed in JP3-286514A, in which an electrode is laminated continuously on a highly dielectric film). A film capacitor of wound type, in which an electrode layer is laminated continuously on a highly dielectric film, has a simple structure and is prepared relatively easily, and is generally prepared in such a manner that two highly dielectric films having an electrode laminated on one surface thereof are overlapped and wound so that the electrodes do not come into contact with each other and after the winding, the films are fixed, if necessary, not to be loosened.

The electrode layer is not limited particularly and is generally a layer made of an electrically conductive metal such as aluminum, zinc, gold, platinum and copper. The electrode layer is used in the form of metallic foil or deposited metal film. In the present invention, any of metallic foil and deposited metal film or a combination thereof may be employed. Usually a deposited metal film is preferred since the electrode layer can be made thin, and as a result, capacity can be made large for its volume, adhesion to the dielectric film is satisfactory, and non-uniformity of thickness is small. A deposited metal film is not limited to one layer, and may comprise multi layers according to necessity, and, for example, there is a method of preparing an electrode layer by forming an aluminum oxide layer of semiconductor further on an aluminum layer for assuring moisture resistance (for example, JP2-250306A). A thickness of a deposited metal film is not limited particularly and is within a range preferably from 100 to 2,000 angstrom, more preferably from 200 to 1,000 angstrom. The thickness of a deposited metal film within this range is suitable from the viewpoint of good balance between capacity and strength of a capacitor.

When a deposited metal film is used as an electrode layer, a method of forming a film is not limited particularly, and, for example, a vacuum evaporation method, sputtering method, ion-plating method and the like can be employed. Usually a vacuum evaporation method is used.

With respect to a vacuum evaporation method, there are a batch method for a molded article and a semi-continuous method and a continuous (air to air) method for a long article, and at present, a semi-continuous method is mainly conducted. A metal deposition method of a semi-continuous type is a method of carrying out metal deposition and winding in a vacuum system, and then bringing the vacuum system to an atmosphere system and taking out a deposited film.

A semi-continuous method can be carried out concretely by the method disclosed in Japanese Patent No. 3664342 and explained by means of FIG. 1.

When a thin metal film layer is formed on a highly dielectric film, a surface of the highly dielectric film can be previously subjected to corona treatment, plasma treatment, or the like for improvement in adhesion. Also, when a metallic foil is used as an electrode layer, a thickness of a metallic foil is not limited particularly, and is usually within a range from 0.1 to 100 μm, preferably from 1 to 50 μm, more preferably from 3 to 15 μm.

A fixing method is not limited particularly, and fixing and protection of a structure may be carried out simultaneously, for example, by sealing with a resin or by putting in an insulating case and then carrying out sealing. Also, a method of connecting a lead wire is not limited particularly, and there is a method of fixing by welding, ultrasonic pressure welding, thermocompression bonding or by using an adhesive tape. A lead wire may be welded to an electrode before winding. When putting in an insulating case and then carrying out sealing, an opening may be sealed with a thermosetting resin such as urethane resin or epoxy resin to prevent deterioration by oxidation.

The thus-obtained film capacitor of the present invention has high dielectric property, high withstanding voltage and small temperature dependency of dielectric loss.

EXAMPLE

The present invention is then explained by means of examples, but is not limited to them.

Values of characteristics used herein are measured by the following methods.

(Thickness)

A thickness of a film placed on a substrate is measured at room temperature with a digital thickness meter (MF-1001 available from Sendai Nikon Corporation).

(Dielectric Loss and Dielectric Constant)

Both surfaces of a highly dielectric film are subjected to aluminum deposition in vacuo to prepare a sample. An electrostatic capacity and dielectric loss tangent of this sample are measured at room temperature (20° C.) and at 80° C. at a frequency of 100 Hz, 1 kHz, 10 kHz and 100 kHz with an impedance analyzer (HP4194A available from Hewlett Packard Company). A dielectric constant and dielectric loss (%) are calculated from the measured electrostatic capacity and dielectric loss tangent.

(Withstanding Voltage)

Withstanding voltage of a film placed on a substrate is measured under dry air atmosphere with a withstanding voltage/insulation resistance tester (TOS9201 available from KIKUSUI ELECTRONICS CORP.). In the measurement, a voltage elevating rate is 100 V/s.

(Electrical Insulating Property)

Volume resistivity (Ω) at 20° C. is measured at DC100V under dry air atmosphere with a digital electronic insulation tester/micro current meter.

(Tensile Strength at Break)

Tensile strength at break (MPa) is measured with a tensile tester (RTC-1225A available from ORIENTEC CORPORATION).

(Tensile Elongation at Break)

Tensile elongation at break (%) is measured with a tensile tester (RTC-1225A available from ORIENTEC CORPORATION).

Example 1

Into a 1-liter separable flask were poured 800 parts by mass of dimethylacetamide (DMAc) (available from Kishida Chemical Co., Ltd.) and 200 parts by mass of polyvinylidene fluoride (PVdF) (KAYNAR 761 available from ARKEMA), followed by 3-hour stirring at 60° C. with a mechanical stirrer to obtain a solution of PVdF having a concentration of 20% by mass.

Separately, into a 1-liter separable flask were poured 800 parts by mass of dimethylacetamide (DMAc) (available from Kishida Chemical Co., Ltd.) and 200 parts by mass of cellulose acetate (AC) (L-20 available from Daicel Chemical Industries, Ltd.), followed by 3-hour stirring at 60° C. with a mechanical stirrer to obtain a solution of cellulose acetate having a concentration of 20% by mass.

These two solutions were mixed to give a mass ratio of PVdF/AC of 95/5, and tetrahydrofuran (THF) was added thereto as a diluting solution in an optional amount to prepare a coating composition of the present invention.

This coating composition was cast on a 38 μm thick nonporous polyester (PET) film subjected to releasing treatment with a micro gravure coater (OS-750 available from Yasui Seiki Co., Ltd.), and the coated film was passed through a 6 m long drying oven of 150° C. and subsequently a 6 m long drying oven of 180° C. to obtain a laminated film comprising a 8 μm thick cast film formed on the PET film. Then, the cast film was peeled from the PET film, and thus, a 8.3 μm thick highly dielectric film of the present invention was obtained.

With respect to the obtained film, withstanding voltage, volume resistivity and tensile strength at break were measured, and dielectric loss and dielectric constant at 20° C. and at 80° C. at each frequency (100 Hz, 1 kHz, 10 kHz and 100 kHz) were calculated. The results are shown in Table 1.

Examples 2 to 4

Coating compositions and nonporous highly dielectric films of the present invention were prepared in the same manner as in Example 1 except that a mass ratio of PVdF/cellulose acetate was changed as shown in Table 1.

With respect to the obtained nonporous highly dielectric films, withstanding voltage, volume resistivity and tensile strength at break were measured, and dielectric loss and dielectric constant at 20° C. and at 80° C. at each frequency were calculated in the same manner as in Example 1. The results are shown in Table 1.

Comparative Example 1

A comparative coating composition and nonporous highly dielectric film were prepared in the same manner as in Example 1 except that only PVdF was used without blending cellulose acetate.

With respect to the obtained nonporous highly dielectric film, withstanding voltage, volume resistivity and tensile strength at break were measured, and dielectric loss and dielectric constant at 20° C. and at 80° C. at each frequency were calculated in the same manner as in Example 1. The results are shown in Table 1.

TABLE 1

|  |  | Com. Ex. | Ex. | | | |
|---|---|---|---|---|---|---|
|  |  | 1 | 1 | 2 | 3 | 4 |
| Coating composition | | | | | | |
| (A) | VdF resin | | | | | |
|  | PVdF | 100 | 95 | 90 | 80 | 70 |
| (B) | Cellulose resin | | | | | |
|  | Cellulose acetate (L-20) | — | 5 | 10 | 20 | 30 |
| Film thickness (μm) | | 8.0 | 8.3 | 8.5 | 7.8 | 8.3 |
| Withstanding voltage (V/μm) | | 450 | 500 | 560 | 620 | 650 |

TABLE 1-continued

|  |  |  | Com. Ex. | Ex. | | | |
|---|---|---|---|---|---|---|---|
|  |  |  | 1 | 1 | 2 | 3 | 4 |
| Volume resistivity ($\times 10^{14}$ Ω·cm) | | | 1.0 | 1.2 | 2.1 | 4.3 | 4.5 |
| Tensile strength at break (MPa) | | | 40 | 39 | 43 | 45 | 44 |
| Dielectric constant | 100 Hz | 20° C. | 11.6 | 9.9 | 8.8 | 8.1 | 7.2 |
|  |  | 80° C. | 13.7 | 13.6 | 11.7 | 10.2 | 9.0 |
|  | 1 kHz | 20° C. | 11.3 | 9.5 | 8.5 | 7.9 | 7.0 |
|  |  | 80° C. | 12.5 | 12.0 | 10.3 | 9.3 | 8.2 |
|  | 10 kHz | 20° C. | 10.8 | 9.3 | 8.3 | 7.7 | 6.8 |
|  |  | 80° C. | 11.5 | 10.4 | 9.0 | 8.3 | 7.3 |
|  | 100 kHz | 20° C. | 10.1 | 8.7 | 7.9 | 7.3 | 6.5 |
|  |  | 80° C. | 11.2 | 9.4 | 8.5 | 7.8 | 7.0 |
| Dielectric loss (%) | 100 Hz | 20° C. | 5.6 | 4.5 | 4.0 | 3.3 | 3.0 |
|  |  | 80° C. | 10.9 | 6.4 | 5.6 | 4.6 | 4.2 |
|  | 1 kHz | 20° C. | 2.4 | 2.2 | 2.2 | 2.0 | 1.9 |
|  |  | 80° C. | 10.6 | 11.9 | 9.8 | 8.4 | 7.8 |
|  | 10 kHz | 20° C. | 2.4 | 2.6 | 2.6 | 2.5 | 2.5 |
|  |  | 80° C. | 8.2 | 8.3 | 7.2 | 6.2 | 5.6 |
|  | 100 kHz | 20° C. | 7.0 | 8.8 | 8.0 | 7.3 | 7.0 |
|  |  | 80° C. | 7.6 | 4.1 | 3.6 | 3.4 | 3.4 |

From the results shown in Table 1, it is seen that by combination use of PVdF and cellulose acetate, dielectric loss at high temperatures is decreased, withstanding voltage is improved as compared with single use of PVdF, electrical insulating property is improved and mechanical strength is also improved.

Examples 5 to 8

Coating compositions and nonporous highly dielectric films of the present invention were prepared in the same manner as in Example 1 except that a mass ratio of PVdF/cellulose acetate was changed as shown in Table 2.

With respect to the obtained nonporous highly dielectric films, withstanding voltage, volume resistivity and tensile strength at break were measured, and dielectric loss and dielectric constant at 20° C. and at 80° C. at each frequency were calculated in the same manner as in Example 1. The results are shown in Table 2.

Comparative Example 2

A comparative coating composition and nonporous highly dielectric film were prepared in the same manner as in Example 1 except that only cellulose acetate was used without blending PVdF.

With respect to the obtained nonporous highly dielectric film, withstanding voltage, volume resistivity and tensile strength at break were measured, and dielectric loss and dielectric constant at 20° C. and at 80° C. at each frequency were calculated in the same manner as in Example 1. The results are shown in Table 2.

TABLE 2

|  |  |  | Ex. | | | | Com. Ex. |
|---|---|---|---|---|---|---|---|
|  |  |  | 5 | 6 | 7 | 8 | 2 |
| Coating composition | | | | | | | |
| (A) VdF resin PVdF | | | 30 | 20 | 10 | 5 | — |

TABLE 2-continued

|  |  |  | Ex. | | | | Com. Ex. |
|---|---|---|---|---|---|---|---|
|  |  |  | 5 | 6 | 7 | 8 | 2 |
| (B) Cellulose resin Cellulose acetate (L-20) | | | 70 | 80 | 90 | 95 | 100 |
| Film thickness (μm) | | | 6.0 | 7.0 | 6.5 | 6.5 | 5.5 |
| Withstanding voltage (V/μm) | | | 630 | 680 | 690 | 710 | 720 |
| Volume resistivity ($\times 10^{14}$ Ω·cm) | | | 6.1 | 6.6 | 7.4 | 7.3 | 7.8 |
| Tensile strength at break (MPa) | | | 48 | 51 | 53 | 52 | 53 |
| Dielectric constant | 100 Hz | 20° C. | 6.3 | 6.0 | 5.1 | 5.0 | 3.5 |
|  |  | 80° C. | 6.9 | 6.5 | 6.3 | 6.2 | 3.8 |
|  | 1 kHz | 20° C. | 6.0 | 5.8 | 4.9 | 4.9 | 3.3 |
|  |  | 80° C. | 6.1 | 6.2 | 6.1 | 6.1 | 3.6 |
|  | 10 kHz | 20° C. | 5.5 | 5.6 | 4.8 | 4.7 | 3.2 |
|  |  | 80° C. | 6.4 | 5.8 | 6.1 | 6.1 | 3.5 |
|  | 100 kHz | 20° C. | 5.6 | 5.5 | 4.7 | 4.6 | 3.0 |
|  |  | 80° C. | 5.9 | 5.7 | 5.8 | 5.6 | 3.3 |
| Dielectric loss (%) | 100 Hz | 20° C. | 2.8 | 2.6 | 2.9 | 2.4 | 2.9 |
|  |  | 80° C. | 4.0 | 3.4 | 1.8 | 1.4 | 6.3 |
|  | 1 kHz | 20° C. | 2.5 | 2.9 | 2.3 | 1.9 | 2.6 |
|  |  | 80° C. | 2.8 | 2.7 | 1.6 | 1.2 | 1.4 |
|  | 10 kHz | 20° C. | 2.9 | 3.2 | 2.8 | 2.2 | 3.1 |
|  |  | 80° C. | 3.2 | 3.1 | 2.3 | 1.8 | 2.3 |
|  | 100 kHz | 20° C. | 4.2 | 4.1 | 3.5 | 3.0 | 3.5 |
|  |  | 80° C. | 3.6 | 3.8 | 3.4 | 2.8 | 4.4 |

From the results shown in Table 2, it is seen that by combination use of PVdF and cellulose acetate, dielectric loss at high temperatures is decreased and withstanding voltage is improved as compared with single use of PVdF.

Example 9

A coating composition and nonporous highly dielectric film of the present invention were prepared in the same manner as in Example 2 except that VdF/TFE (80/20 in mole %) was used as a VdF resin.

With respect to the obtained nonporous highly dielectric film, withstanding voltage and dielectric loss and dielectric constant at 20° C. and at 80° C. at each frequency were calculated in the same manner as in Example 2. The results are shown in Table 3.

Example 10

A coating composition and nonporous highly dielectric film of the present invention were prepared in the same manner as in Example 2 except that VdF/HFP (88/12 in mole %) was used as a VdF resin.

With respect to the obtained nonporous highly dielectric film, withstanding voltage and dielectric loss and dielectric constant at 20° C. and at 80° C. at each frequency were calculated in the same manner as in Example 2. The results are shown in Table 3.

Example 11

A coating composition and nonporous highly dielectric film of the present invention were prepared in the same manner as in Example 2 except that hydroxy propyl methyl cellulose (60SH03 available from Shin-Etsu Chemical Co., Ltd.) which is ether-substituted cellulose was used as a cellulose resin.

With respect to the obtained nonporous highly dielectric film, withstanding voltage, volume resistivity and tensile strength at break were measured, and dielectric loss and dielectric constant at 20° C. and at 80° C. at each frequency were calculated in the same manner as in Example 2. The results are shown in Table 3.

TABLE 3

| | | | Ex. | | |
|---|---|---|---|---|---|
| | | | 9 | 10 | 11 |
| Coating composition | | | | | |
| (A) | VdF resin | | | | |
| | PVdF | | — | — | 90 |
| | PVdF/TFE | | 90 | — | — |
| | PVdF/HFP | | — | 90 | — |
| (B) | Cellulose resin | | | | |
| | Cellulose acetate (L-20) | | 10 | 10 | — |
| | Ether-substituted cellulose | | — | — | 10 |
| Film thickness (μm) | | | 6.5 | 6.5 | 6.8 |
| Withstanding voltage (V/μm) | | | 550 | 520 | 560 |
| Volume resistivity (×10$^{14}$ Ω·cm) | | | — | — | 1.0 |
| Tensile strength at break (MPa) | | | — | — | 35 |
| Dielectric constant | 100 Hz | 20° C. | 9.8 | 9.8 | 9.0 |
| | | 80° C. | 12.4 | 12.2 | 11.6 |
| | 1 kHz | 20° C. | 9.3 | 9.2 | 8.6 |
| | | 80° C. | 11.2 | 11.0 | 10.5 |
| | 10 kHz | 20° C. | 8.5 | 8.6 | 7.8 |
| | | 80° C. | 9.8 | 9.9 | 9.1 |
| | 100 kHz | 20° C. | 8.6 | 8.4 | 8.0 |
| | | 80° C. | 9.1 | 9.2 | 8.4 |
| Dielectric loss (%) | 100 Hz | 20° C. | 4.6 | 4.5 | 3.2 |
| | | 80° C. | 5.3 | 5.5 | 4.0 |
| | 1 kHz | 20° C. | 2.7 | 2.8 | 2.1 |
| | | 80° C. | 9.4 | 9.2 | 8.5 |
| | 10 kHz | 20° C. | 3.2 | 3.5 | 2.5 |
| | | 80° C. | 8.0 | 8.2 | 7.0 |
| | 100 kHz | 20° C. | 9.0 | 9.2 | 8.2 |
| | | 80° C. | 4.3 | 4.4 | 3.2 |

From the results shown in Table 3, it is seen that even if a VdF resin is changed to VdF/TFE or VdF/HFP and ether-substituted cellulose is used as a cellulose resin, dielectric loss at high temperatures is decreased and withstanding voltage is improved.

Examples 12 to 15

Coating compositions and nonporous highly dielectric films of the present invention were prepared in the same manner as in Examples 1 to 4, respectively except that cellulose acetate (L-70 available from Daicel Chemical Industries, Ltd.) having different degree of acetylation was used as a cellulose acetate.

With respect to the obtained nonporous highly dielectric films, withstanding voltage and dielectric loss and dielectric constant at 20° C. and at 80° C. at each frequency were calculated in the same manner as in Example 1. The results are shown in Table 4.

Comparative Example 3

A comparative coating composition and nonporous highly dielectric film were prepared in the same manner as in Example 12 except that only cellulose acetate (L-70 available from Daicel Chemical Industries, Ltd.) was used without blending PVdF.

With respect to the obtained nonporous highly dielectric film, withstanding voltage and dielectric loss and dielectric constant at 20° C. and at 80° C. at each frequency were calculated in the same manner as in Example 12. The results are shown in Table 4.

TABLE 4

| | | | Com. Ex. | Ex. | | | | Com. Ex. |
|---|---|---|---|---|---|---|---|---|
| | | | 1 | 12 | 13 | 14 | 15 | 3 |
| Coating composition | | | | | | | | |
| (A) | VdF resin | | | | | | | |
| | PVdF | | 100 | 95 | 90 | 80 | 70 | — |
| (B) | Cellulose resin | | | | | | | |
| | Cellulose acetate (L-70) | | — | 5 | 10 | 20 | 30 | 100 |
| Film thickness (μm) | | | 8.0 | 6.3 | 6.7 | 7.9 | 7.3 | 5.1 |
| Withstanding voltage (V/μm) | | | 450 | 580 | 650 | 680 | 710 | 720 |
| Dielectric constant | 100 Hz | 20° C. | 11.6 | 10.4 | 9.3 | 8.6 | 7.6 | 3.3 |
| | | 80° C. | 13.7 | 13.8 | 11.9 | 10.5 | 9.5 | 3.5 |
| | 1 kHz | 20° C. | 11.3 | 9.9 | 8.9 | 8.3 | 7.4 | 3.1 |
| | | 80° C. | 12.5 | 12.3 | 10.8 | 9.7 | 8.8 | 3.4 |
| | 10 kHz | 20° C. | 10.8 | 9.7 | 8.1 | 8.1 | 7.2 | 3.1 |
| | | 80° C. | 11.5 | 10.6 | 9.4 | 8.5 | 7.8 | 3.3 |
| | 100 kHz | 20° C. | 10.1 | 9.1 | 8.2 | 7.7 | 6.8 | 3.0 |
| | | 80° C. | 11.2 | 9.8 | 8.7 | 8.0 | 7.4 | 3.1 |
| Dielectric loss (%) | 100 Hz | 20° C. | 5.6 | 4.7 | 4.3 | 3.5 | 3.3 | 2.8 |
| | | 80° C. | 10.9 | 5.5 | 5.0 | 4.5 | 3.7 | 6.2 |
| | 1 kHz | 20° C. | 2.4 | 2.5 | 2.4 | 2.1 | 2.0 | 2.5 |
| | | 80° C. | 10.6 | 9.7 | 9.0 | 8.3 | 7.4 | 1.5 |
| | 10 kHz | 20° C. | 2.4 | 2.9 | 2.8 | 2.7 | 2.6 | 3.0 |
| | | 80° C. | 8.2 | 7.9 | 7.5 | 6.5 | 5.9 | 2.2 |
| | 100 kHz | 20° C. | 7.0 | 9.0 | 8.6 | 7.9 | 7.3 | 3.4 |
| | | 80° C. | 7.6 | 4.3 | 3.9 | 3.5 | 3.4 | 4.2 |

From the results shown in Table 4, it is seen that by combination use of PVdF and cellulose acetate, dielectric constant is improved as compared with single use of cellulose, and by combination use of PVdF and cellulose acetate, dielectric loss at high temperatures is decreased and withstanding voltage is improved as compared with single use of PVdF.

Example 16

A coating composition and nonporous highly dielectric film of the present invention were prepared in the same manner as in Example 3 except that 20 parts by mass of rubber particles No. 1 (rubber particles comprising acrylic rubber as a core and polymethyl methacrylate as a shell (EXL2313 available from Rohm and Haas Japan K.K., average primary particle size: 0.6 μm) was further blended based on the total amount (100 parts by mass) of PVdF and cellulose acetate.

With respect to the obtained nonporous highly dielectric film, withstanding voltage, volume resistivity, tensile strength at break and tensile elongation at break were measured, and dielectric loss and dielectric constant at 20° C. and at 80° C. at each frequency were calculated in the same manner as in Example 1. The results are shown in Table 5.

Examples 17 and 18

Coating compositions and nonporous highly dielectric films of the present invention were prepared in the same manner as in Example 16 except that rubber particles No. 2 shown in Table 5 were used instead of rubber particles No. 1 (Example 17) and the amount of rubber particles No. 1 was changed to 10 parts by mass (Example 18).

With respect to the obtained nonporous highly dielectric films, withstanding voltage, volume resistivity, tensile strength at break and tensile elongation at break were measured, and dielectric loss and dielectric constant at 20° C. and at 80° C. at each frequency were calculated in the same manner as in Example 1. The results are shown in Table 5.

Rubber particles shown in Table 5 are as follows.
Rubber Particles No. 1:
 Rubber particles (EXL2313 available from Rohm and Haas Japan K.K., average primary particle size: 0.6 μm) comprising a core made of acrylic rubber and a shell made of polymethyl methacrylate Rubber Particles No. 2:
 Rubber particles (KCA801N available from Rohm and Haas Japan K.K., average primary particle size: 0.2 μm) comprising a core made of butadiene rubber and a shell made of polymethyl methacrylate

TABLE 5

| | | Ex. | | | | | |
|---|---|---|---|---|---|---|---|
| | | 16 | | 17 | | 18 | |
| D) | Rubber particles (part by mass) | | | | | | |
| | No. 1 | 20 | | — | | 10 | |
| | No. 2 | — | | 20 | | — | |
| | Film thickness (μm) | 7.4 | | 7.1 | | 7.8 | |
| | Volume resistivity (Ω·cm) | $2.2 \times 10^{14}$ | | $2.7 \times 10^{14}$ | | $2.2 \times 10^{14}$ | |
| | Withstanding voltage (V/μm) | 590 | | 580 | | 610 | |
| | Tensile strength at break (MPa) | 46 | | 45 | | 45 | |
| | Tensile elongation at break (%) | 40 | | 38 | | 35 | |
| Temperature at measurement | | (20° C.) | (80° C.) | (20° C.) | (80° C.) | (20° C.) | (80° C.) |
| Dielectric constant | | | | | | | |
| 100 Hz | | 5.4 | 7.8 | 6.3 | 7.6 | 6.5 | 8.5 |
| 1 kHz | | 5.3 | 7.6 | 5.8 | 7.5 | 5.9 | 8.0 |
| 10 kHz | | 5.0 | 7.3 | 5.4 | 7.1 | 5.7 | 7.6 |
| Dielectric loss (%) | | | | | | | |
| 100 Hz | | 4.1 | 6.5 | 4.4 | 7.0 | 3.8 | 4.5 |
| 1 kHz | | 2.3 | 7.6 | 2.7 | 7.8 | 2.2 | 2.0 |
| 10 kHz | | 2.2 | 6.6 | 2.5 | 6.9 | 2.3 | 2.5 |

From the results shown in Table 5, it is seen that by adding rubber particles, withstanding voltage, volume resistivity and elongation are improved as compared with single use of PVdF.

Example 19

Electrodes were formed on both surfaces of the nonporous highly dielectric film prepared in Example 1 by deposition of aluminum with a vacuum evaporator (VE-2030 available from VACUUM DEVICE INC.) so as to have 3Ω/□. A lead wire for applying voltage was fit to these aluminum electrodes to prepare a film capacitor of stamp type (for easy evaluation).

The invention claimed is:
1. A coating composition for forming a highly dielectric film without highly dielectric inorganic particles, comprising:
 (A) a vinylidene fluoride resin,
 (B) a cellulose resin, and
 (C) a solvent
 wherein the highly dielectric inorganic particles are particles of strontium titanate, barium titanate, lead zirconium titanate oxides (PZT), barium zirconium titanate, barium zirconate, strontium zirconate, calcium titanate or calcium zirconate, and wherein a mass ratio of the vinylidene fluoride resin (A)/cellulose resin (B) is 0.1/99.9 to 99.9/0.1, wherein the vinylidene fluoride resin (A) is a polymer comprising 60 to 100% by mole of vinylidene fluoride unit, 0 to 40% by mole of tetrafluoroethylene unit and 0 to 40% by mole of hexafluoropropylene, and the cellulose resin (B) is cellulose acetate or ether-substituted cellulose.

2. The coating composition of claim 1, further comprising rubber particles (D).

3. A method for preparing a nonporous highly dielectric film comprising casting the coating composition of claim 1 on a surface of a nonporous substrate, and after drying, separating a film from the substrate.

4. A nonporous highly dielectric film obtained by the preparation method of claim 3.

5. The nonporous highly dielectric film of claim 4 which is for a film capacitor.

6. A film capacitor prepared by laminating an electrode layer on at least one surface of the highly dielectric film of claim 4.

7. A nonporous highly dielectric film comprising a vinylidene fluoride resin (A) and a cellulose resin (B), and (A) is contained in an amount of 2 to 98 parts by mass when the total amount of (A) and (B) is assumed to be 100 parts by mass, and highly dielectric inorganic particles are not contained, wherein the highly dielectric inorganic particles are particles of strontium titanate, barium titanate, lead zirconium titanate oxides (PZT), barium zirconium titanate, barium zirconate, strontium zirconate, calcium titanate or calcium zirconate, and wherein the vinylidene fluoride resin (A) is a polymer comprising 60 to 100% by mole of vinylidene fluoride unit, 0 to 40% by mole of tetrafluoroethylene unit and 0 to 40% by mole of hexafluoropropylene, and the cellulose resin (B) is cellulose acetate or ether-substituted cellulose.

8. The nonporous highly dielectric film of claim 7, wherein rubber particles (D) are contained in an amount of 1 to 30 parts by mass based on 100 parts by mass of the vinylidene fluoride resin (A).

9. The nonporous highly dielectric film of claim 7 which is for a film capacitor.

10. A film capacitor prepared by laminating an electrode layer on at least one surface of the highly dielectric film of claim 7.

* * * * *